(12) United States Patent
Otta

(10) Patent No.: US 9,180,800 B2
(45) Date of Patent: Nov. 10, 2015

(54) ADD-ON VEHICLE SEAT ASSEMBLY

(75) Inventor: George Otta, Minden (CA)

(73) Assignee: Tailbreaker Corp, Toronto (CA)

( * ) Notice: Subject to any disclaimer, the term of this patent is extended or adjusted under 35 U.S.C. 154(b) by 459 days.

(21) Appl. No.: 13/433,440

(22) Filed: Mar. 29, 2012

(65) Prior Publication Data
US 2013/0257121 A1    Oct. 3, 2013

(30) Foreign Application Priority Data

Mar. 23, 2012 (CA) .................................... 2772812

(51) Int. Cl.
*B60N 2/30* (2006.01)
*B60N 2/14* (2006.01)
*B60N 2/24* (2006.01)

(52) U.S. Cl.
CPC .. *B60N 2/24* (2013.01); *B60N 2/14* (2013.01); *B60N 2/3011* (2013.01); *B60N 2/3097* (2013.01)

(58) Field of Classification Search
CPC ........................................................ B60N 2/24
USPC .......... 297/217.1; 280/186; 248/240.3, 309.1; 108/44
See application file for complete search history.

(56) References Cited

U.S. PATENT DOCUMENTS

| | | | |
|---|---|---|---|
| 3,865,431 A | 2/1975 | Zakhi | |
| 5,000,504 A | 3/1991 | Munguia | |
| 5,197,381 A | 3/1993 | Mells | |
| 5,462,334 A | 10/1995 | Sedorcek et al. | |
| 5,503,423 A * | 4/1996 | Roberts et al. | 280/491.3 |
| 5,857,741 A | 1/1999 | Anderson | |
| 6,095,059 A | 8/2000 | Riley | |
| 6,314,891 B1 | 11/2001 | Larson | |
| 6,701,913 B1 * | 3/2004 | LeDuc et al. | 126/276 |
| 6,722,380 B1 * | 4/2004 | Hafer | 135/16 |
| 6,739,643 B1 * | 5/2004 | Rock et al. | 296/64 |
| 6,808,231 B1 | 10/2004 | Hill | |
| 6,935,064 B1 * | 8/2005 | Thompson | 42/94 |
| 7,229,130 B1 * | 6/2007 | Holly et al. | 297/217.1 |
| 7,536,820 B2 * | 5/2009 | Wade et al. | 42/94 |
| D593,760 S | 6/2009 | Fidler | |
| 7,810,439 B2 * | 10/2010 | Bless | 108/44 |
| 8,485,207 B1 * | 7/2013 | Boyington | 135/88.08 |

OTHER PUBLICATIONS

Patent Examination Report in counterpart application in Australia, AU Application No. 2013231042, 4 pages, Nov. 4, 2013.

* cited by examiner

*Primary Examiner* — David R Dunn
*Assistant Examiner* — Timothy J Brindley
(74) *Attorney, Agent, or Firm* — DiBerardino McGovern IP Group LLC

(57) ABSTRACT

An add-on seat assembly is provided for temporary attachment to the rear of a vehicle. Such seat assembly includes a hitch bar, one end of which has, intimately associated therewith, a structure and arrangement for releasable attachment to a trailer hitch which is intimately associated with the rear of a vehicle. The hitch bar includes a securement structure extending across the opposed other end thereof. The seat assembly includes a pair of arms that are demountably and rotatably attached to a respective one opposed end of the securement structure. The seat assembly also includes a pair of seat units, each including a seat bottom that is foldably secured to a seat back, the bottom of the seat bottom including a structure for demountably and rotatably attaching the seat unit to a respective one of the pair of arms.

16 Claims, 5 Drawing Sheets

ADD-ON VEHICLE SEAT ASSEMBLY

CROSS REFERENCE TO RELATED APPLICATION

This application claims priority under 35 U.S.C. §119(a) to a Canadian application filed on Mar. 23, 2012 by George Otta, and titled "Add-On Vehicle Seat Assembly," the entire contents of which are incorporated herein by reference.

TECHNICAL FIELD

This disclosure relates to a seat assembly and more particularly to an add-on seat assembly. In non-limiting examples, such add-on seat assembly is structured and arranged to be attached to the rear hitch of a vehicle or to the trunk latch of a vehicle, or to the open or closed tailgate of a vehicle, or to the open trunk of a vehicle or to the bumper of a vehicle.

BACKGROUND

There is often a use for seating accommodation outside a parked vehicle. One example is at sporting events, when an outdoor party or picnic occurs before the sporting event, typically in the parking lot around the vehicles. Another example is when camping or while making a stop while driving, when it is convenient to have seating outside of the vehicle to sit outdoors, for picnics or to socialize. Still another example is for outdoor sports and recreation, when it is useful to have an outdoor seating and work area to prepare equipment or sit while carrying out the activity. Yet another example is for fieldwork, such as at a construction site, when it is useful to have a convenient seating and eating area for breaks and a place to review work and papers.

One possibility for providing seating around a parked vehicle is to transport chairs in the vehicle to use at the site. Another possibility is to use folding chairs.

SUMMARY

In general aspects, a seating and working apparatus (a seat assembly) is described that can be attached to the rear hitch of a vehicle or to the trunk latch of a vehicle or to the open or closed tailgate of a vehicle, or to the bumper of a vehicle, and that can be readily assembled and attached thereto and thereafter can easily be disassembled into a compact format that is easily stored in the vehicle or elsewhere.

In some general aspects, an add-on seat assembly is used for temporary attachment to the rear of a vehicle. The seat assembly includes a hitch bar, one end of which is structured and arranged to be releasably attachable to the rear of a vehicle, the hitch bar including a securement structure extending across the other end of the hitch bar. The seat assembly further includes a pair of arms demountably and rotatably attached to a respective one opposed end of the securement structure. The seat assembly also includes a pair of seat units, each including a seat bottom that is foldably secured to a seat back, the bottom of the seat bottom including a structure for demountably and rotatably attaching the seat unit to a respective one of the pair of arms.

The structure and arrangement of the hitch bar can include a structure for coupling the hitch bar to a trailer hitch secured to the rear of a vehicle. By one variant thereof, the structure for coupling the hitch bar to a trailer hitch secured to the rear of a vehicle includes a ball and socket structure. By another variant thereof, the structure for coupling the hitch bar to a trailer hitch secured to the rear of a vehicle includes apertures in the hitch bar and apertures in the trailer hitch for insertion of a pin into mating apertures in the hitch bar and apertures in the trailer hitch. By another variant thereof, the structure and arrangement of the hitch bar includes a structure for coupling the hitch bar to the tailgate of a vehicle that includes a horizontally-oriented attachment on the hitch bar U-shaped adapter so that the seat assembly can be attached to the closed tailgate of a vehicle. By another variant thereof, the structure and arrangement of the hitch bar includes a structure for coupling the hitch bar to the tailgate of a vehicle that includes a vertically-oriented attachment of the hitch bar U-shaped adapter so that the seat assembly can be attached to the open tailgate of a vehicle. By another variant thereof, the structure and arrangement of the hitch bar includes a structure for coupling the hitch bar to the tailgate of a vehicle that includes a depending "J"-hook so that the seat assembly can be attached to the open trunk of a vehicle. By another variant thereof, the structure and arrangement of the hitch bar for coupling the hitch bar includes a pair of vertical horizontally spaced-apart hangers for attaching the seat assembly either to the open trunk of the vehicle or the bumper of the vehicle.

In other general aspects, the structure for demountably and rotatably attaching the pair of arms to a respective one opposed end of the securement structure includes a cylindrical knob at a securement end of an arm, the cylindrical knob including a central aperture, and the securement structure extending across the other end of the hitch bar includes a cooperating aperture, such that a pin may be inserted into the cooperating apertures to provide a demountable and rotatable attachment.

In another general aspect, the structure for demountably and rotatably attaching the seat unit to a respective one of the pair of arms of the seat assembly includes a cylindrical connector descending from the bottom of the seat bottom for insertion into a central aperture of a cylindrical knob at the free end of the associated one of the pair of arms, thereby to provide a demountable and rotatable attachment.

In another general aspect, the edge of the seat bottom, which is foldably secured to the seat back, includes a tab that extends upwardly in the direction of the seat back bottom of the seat bottom for holding the seat in its erected position when the seats are not folded.

In still another general aspect, the seat assembly is formed of a synthetic plastic material. By variants thereof, the synthetic plastic material can be polyethylene, or polypropylene or poly vinyl chloride.

In other general aspects, the seat assembly is formed of a steel.

In another general aspect, the seat assembly is formed of rigid circular tubing, oval tubing, channel or angle shapes.

The seat assembly described herein does not require significant space for transport and is not awkward to transport. Moreover, the seat assembly is not limited by uneven or unstable terrain around the parked car. The seat assembly is an add-on seat assembly that can be easily assembled and attached to the rear hitch of a vehicle or to the trunk latch of a vehicle or to the open or closed tailgate of a vehicle, or to the bumper of a vehicle. Such add-on seat assembly is easily disassembled and able to be folded into a convenient size for carrying and stowing in the vehicle.

Thus, the add-on seat assembly is structured and arranged to be releasably attachable to the rear hitch of a vehicle or to the trunk latch of a vehicle or to the open tailgate of a vehicle. The seat assembly includes a hitch bar, arms and seats.

The hitch bar is the part that is releasably mountable on the trailer hitch, or to the trunk latch of a vehicle, or to the open or closed tailgate of a vehicle which is also provided with a trailer hitch, or to the closed trunk of a vehicle that is also provided with a trailer hitch, or to the bumper of a vehicle that is also provided with a trailer hitch.

As noted above, the hitch bar has a hitch end and an outfacing end, with a hitch insert on the hitch end and a securement structure on the outfacing end. A pair of arms can be attached to the hitch bar with an upper and a lower plate of the securement structure, through a suitable mechanism, for example, a pin or bolt or other mechanical equivalent that allows the arms to swivel independently. One or more seats are provided that can be attached to the arms, in a way, as noted above, that allows the seats to swivel independently. The seats can be hinged between the seat bottom and the seat back, so that the seats can be folded.

The add-on seat assembly allows the user to use a hitch assembly that is secured to the rear of the vehicle, or to the tailgate that is already a part of the vehicle, or to the trunk latch that is already a part of the vehicle, or to a tailgate of a vehicle that will be provided with a trailer hitch, or to a trunk of a vehicle that will be provided with a trailer hitch, or to the bumper of a vehicle that will be provided with a trailer hitch. In the embodiment in which the hitch bar is attached to the hitch of a vehicle that has a tailgate, once the seat assembly is coupled to the hitch, the tailgate can be folded down and a person can sit on a seat of the seat assembly and the tailgate can thus be used as a table or a work bench, and one or two people can sit down and enjoy a meal and a drink at a tailgate party or rebuild a rifle on a hunting trip out in the field.

The hitch bar and arms of the seat assembly described herein can be made of a rigid, rectangular tubing, such as a synthetic plastic material, for example, polyethylene or polypropylene or poly vinyl chloride plastic, or steel. However, a rigid and circular tubing, oval tubing, channel or angle shapes, or other materials could be equally suitable.

One or more seats can be utilized, but the one particular design includes two seats, each of which swivels independently. Both seats can also rotate 360° independently on the outer end of the arm, so the seats can be turned towards the vehicle so the seated person can make use of the tailgate, or the seats can be turned away from the vehicle, for example, so that a person can sit in front of a camp fire. In an alternative configuration, an attachment with a stand for a dirt bike can replace one of the seats. The bike could be set on the stand to be worked on when out riding.

The add-on seat assembly can be disassembled and removed from the vehicle. In storage, the hitch bar and arms can be removed and folded into a compact configuration and the seats can be removed and folded into a flat configuration, thus allowing easy storage in the vehicle, either behind or under the seats or bench of a pickup truck.

DRAWING DESCRIPTION

DETAILED DESCRIPTION

Figure 1:
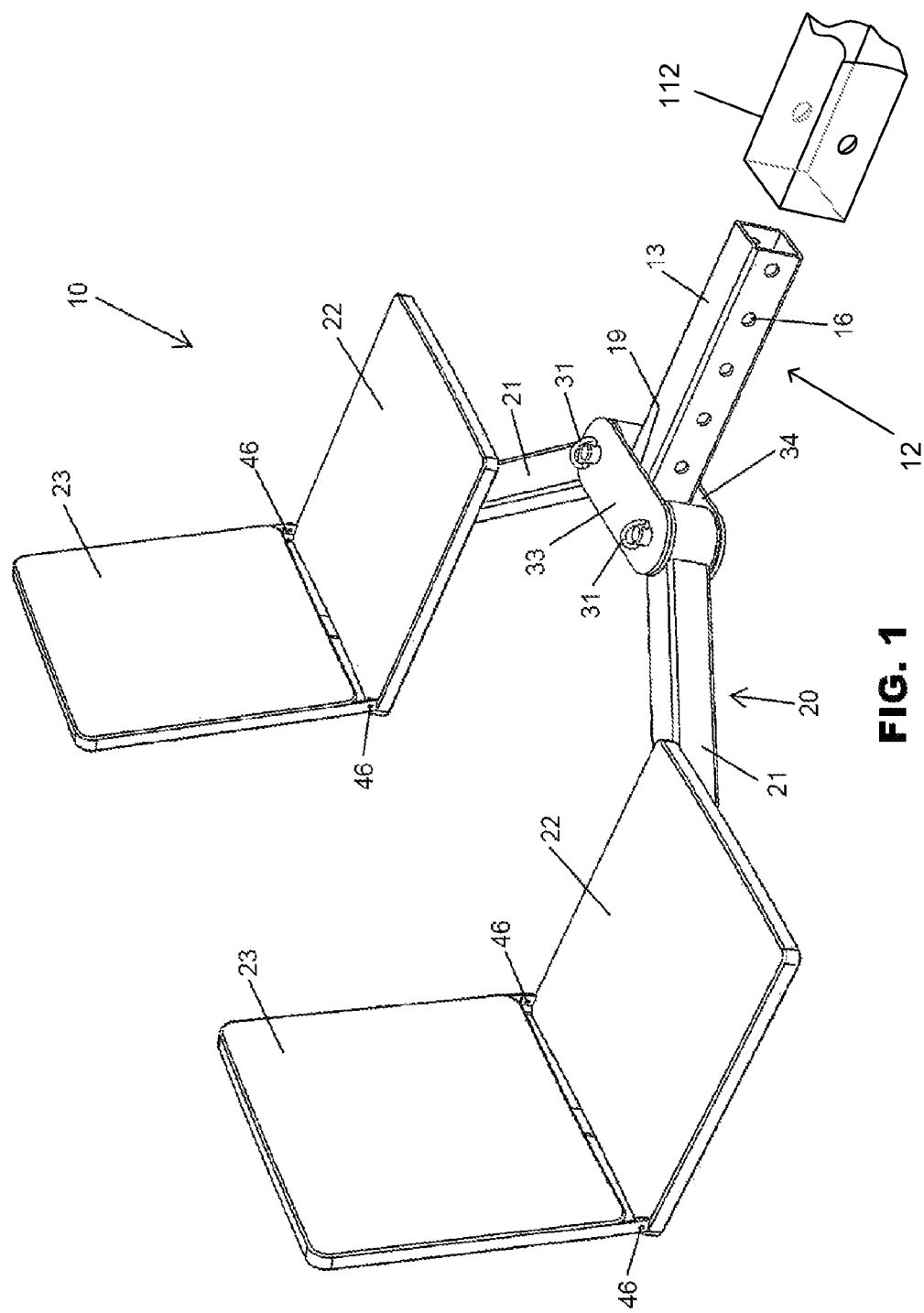
FIG. 1 is a perspective view of an exemplary embodiment of the seat assembly.
Figure 2:
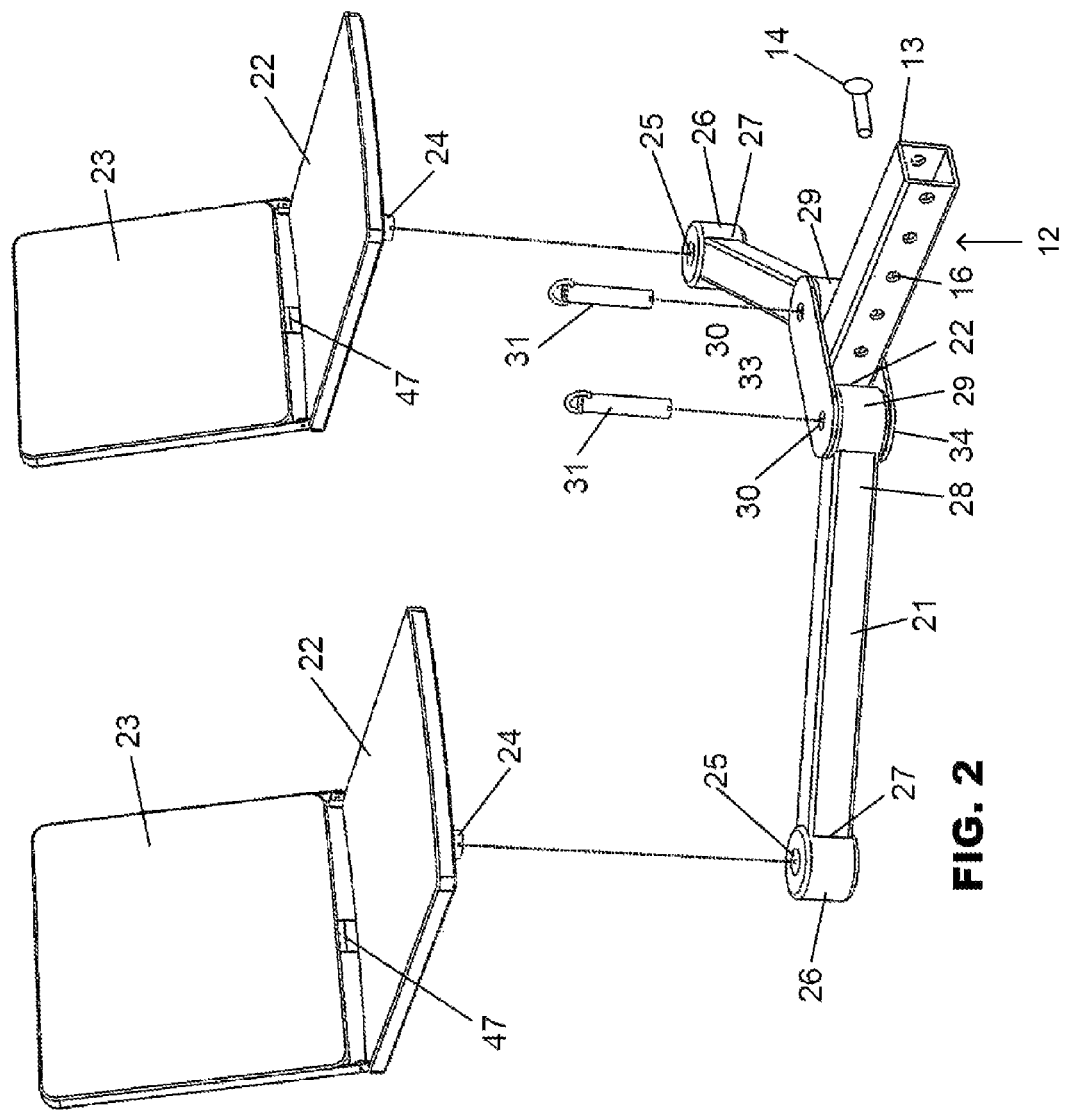
FIG. 2 is an exploded perspective view of the embodiment of the seat assembly shown in FIG. 1.

Referring to FIGS. 1 to 2, a seat assembly 10 is structured and arranged to be releasably mountable to a vehicle trailer hitch 112 (FIG. 1). The seat assembly 10 includes a hitch bar 12 having a hitch end 13 and a rearward extending end 19. The hitch end 13 is structured and arranged to be removably extendible into the trailer hitch 112 of the vehicle. The rearward extending outer end 19 of the hitch bar 12 is provided with an upper cross-plate 33 and a lower cross-plate 34, each provided with a vertical aperture 30. A pin 14 is extendable into the hitch and through a selected aperture 16 of the hitch end 13 of the hitch bar 12 to hold the hitch bar 12 securely to the hitch. When the hitch end 13 is extended into the trailer hitch, the outer end 19 of the hitch bar 12 extends rearward from the vehicle.

A seat coupler 20 includes two structural units, namely an arm 21 and a seat unit that includes a seat bottom 22 and a seat back 23. As seen in FIG. 2, the seat bottom 22 is provided with a depending cylindrical connector 24 that is adapted to be inserted onto a central aperture 25 in a cylindrical knob 26 at the outer end 27 of the arm 21. The inner end 28 of the arm 21 has a terminal cylindrical knob 29, which is provided with a central aperture. A pin 31 secures the arm 21 to the hitch bar 12 by being inserted into an aperture 30 that communicates with the central aperture 25 in the terminal cylindrical knob 29. In some embodiments, there are two identical seat structural units.

As previously described, the seat includes the seat bottom 22 and the seat back 23. The seat back 23 is attached to, and extends upwardly from, the seat bottom 22 by a seat hinge 46, which allows the seat back 23 to fold down against the seat bottom 22. The edge of the seat bottom 22 that attaches to the seat back 23 has a tab 47 attached that extends upward in the direction of the seat back 23 and holds the seat back 23 in its erected position when the seats are not folded.

The seat assembly 10 is shown in the assembled position in FIG. 1 and the sequence of assembly is shown in FIG. 2. In that sequence, the hitch end 13 is inserted into the trailer hitch and the hitch pin 14 anchors it in place. The appropriate hitch bar aperture 16 is used so that the tailgate of the vehicle can be lowered (not shown). The structural units including the arm 21 and the seat unit including the seat bottom 22 and the seat back 23 are secured to the rearward extending end of the hitch bar 19 as previously described by way of the pins 31 into the apertures 30. The seat including the seat bottom 22 and the seat back 23 is rotatably mounted to the arms 21 by way of the cylindrical connector 24 being inserted into the aperture 25 of the knob 26.

Figure 3:
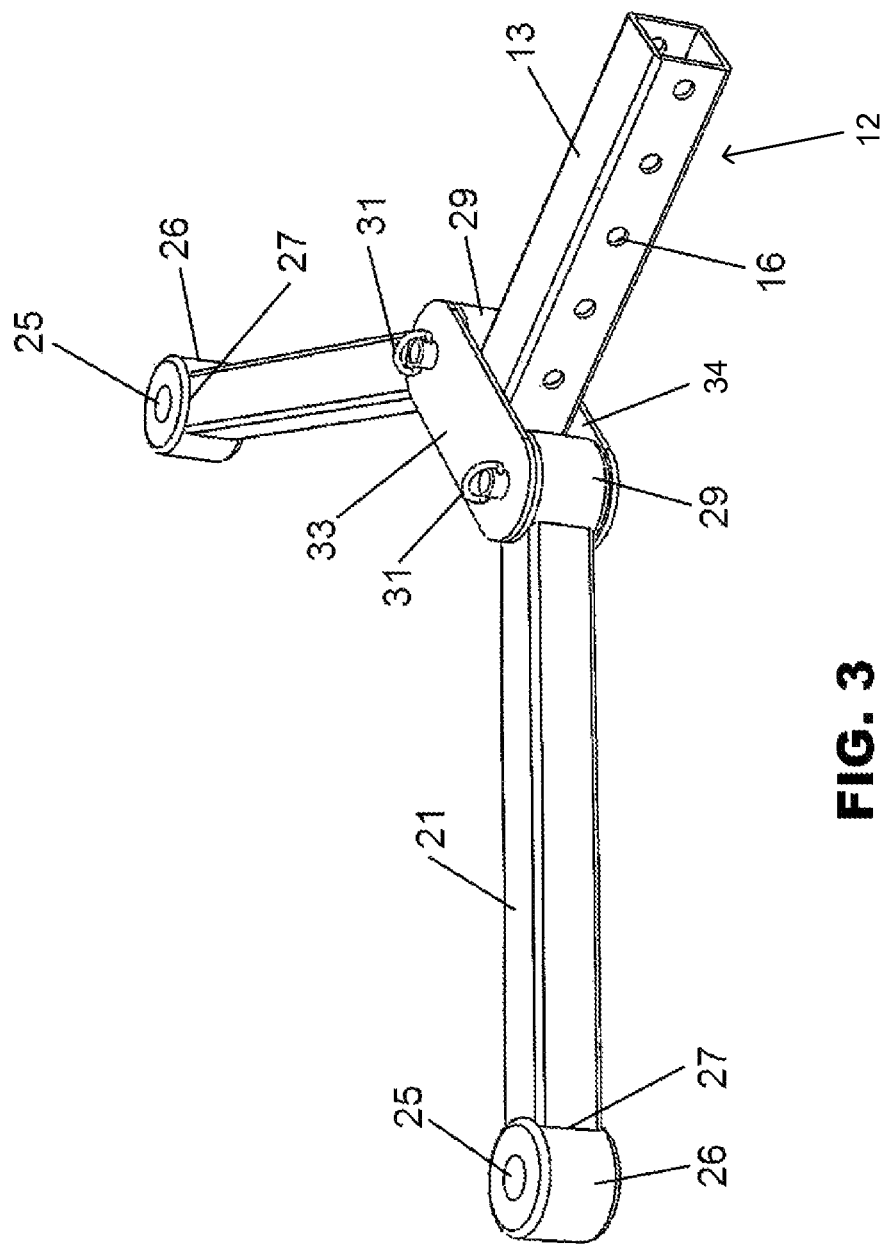
FIG. 3 is a perspective view of a hitch bar and arms of the embodiment of the seat assembly shown in FIG. 1.
Figure 4:
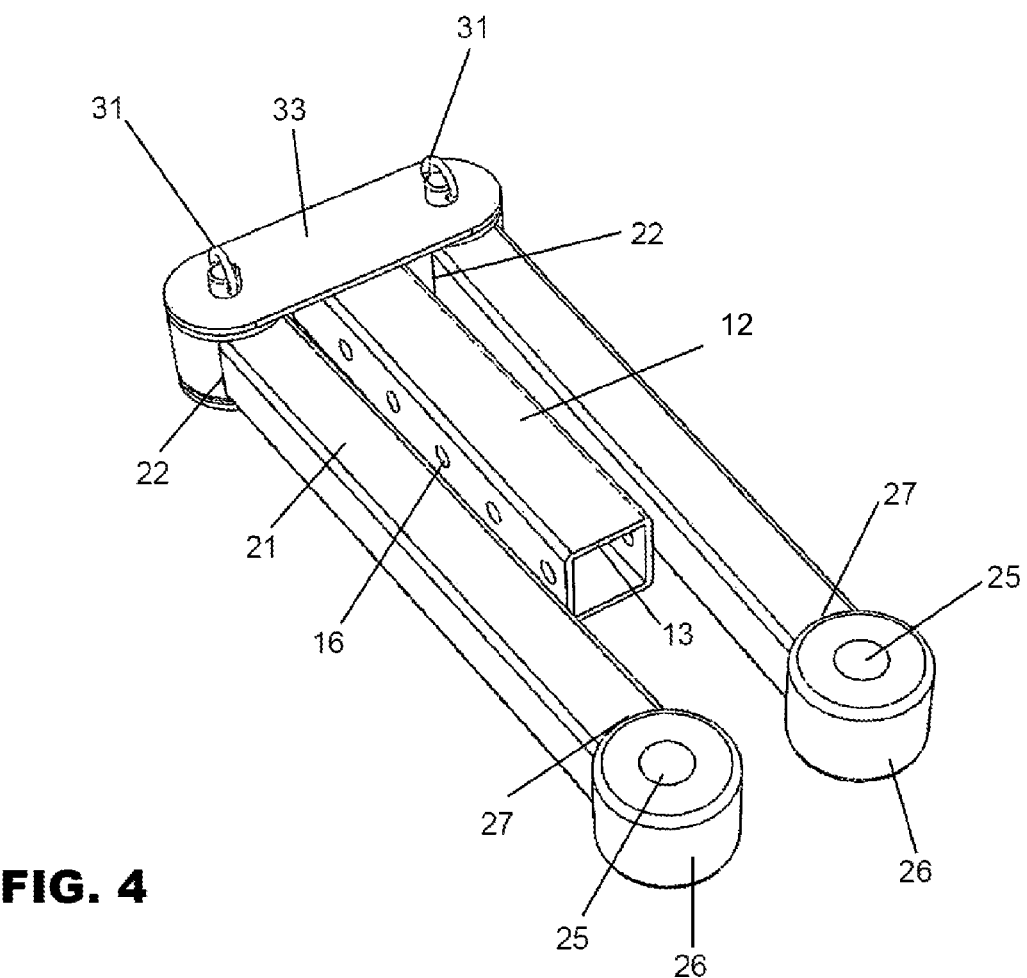
FIG. 4 is a perspective view of the hitch bar and arms of the embodiment of the seat assembly shown in FIG. 1 as shown in the folded position.
Figure 5:
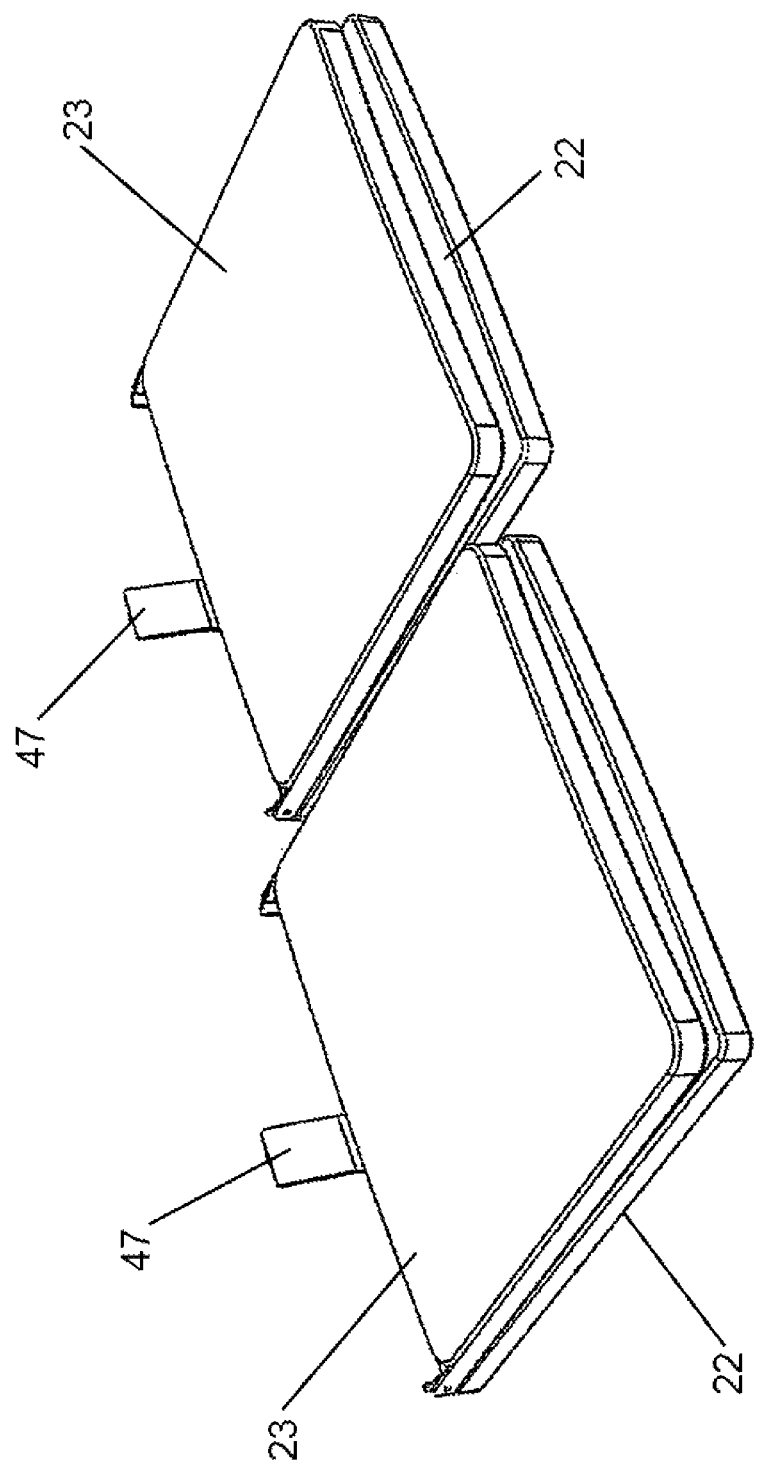
FIG. 5 is a perspective view of the folded seats of the seat assembly of the embodiment shown in FIG. 1.

The seat assembly 10 is disassembled in the reverse order. The seat assembly 10 is folded for storage as shown in FIGS. 3 to 5. FIG. 3 shows the frame unit including only the hitch bar 12 and two arms 21 in a "Y"-shaped configuration. FIG. 4 shows the frame unit including only the hitch bar 12 and two arms 21 in a parallel configuration with the hitch bar 12 between the two arms 21. FIG. 5 shows the seat unit including the seat back 23 and the seat bottom 22 in a folded configuration for storage.

In use, the seat assembly 10 is attached to a trailer hitch of a vehicle. Once the seat assembly 10 is attached, the user sits on one of the seat bottoms 22 of the seat assembly 10. The seat unit (which includes the seat bottom 22 and the seat back 23) can swivel on the outer end 27 of the arm 21 to allow the user to face away from the vehicle, or to face toward the vehicle and allow the user to use the tailgate as a working or eating surface. The arm 21 can also swivel on the hitch bar 12, allowing the user to be positioned closer to or farther away from the vehicle.

With respect to the above description, it is to be realized that the optimum variations in materials, shape and form are deemed readily apparent and obvious to one skilled in the art, and all equivalent relationships to those illustrated in the drawings and described in the specification are intended to be encompassed by this description.

Therefore, the foregoing is considered as illustrative only of the principles of the seat assembly. Further, since numerous modifications and changes will readily occur to those skilled in the art, it is not desired to limit the seat assembly to the exact construction and operation shown and described, and accordingly all suitable modifications and equivalents may be resorted to, falling within the scope of the assembly.

What is claimed is:

1. An add-on seat assembly for temporary attachment to the rear of a vehicle, the assembly comprising:
 a hitch bar, a first end of which has, intimately associated therewith, a structure and arrangement for releasable attachment to a trailer hitch intimately associated with the rear of a vehicle, said hitch bar including a securement structure extending across a second and opposed end thereof, wherein:
  a hitch longitudinal direction extends between the first and second ends of the hitch bar, and
  the securement structure extends along a securement longitudinal direction;
 a pair of arms demountably and rotatably attached to a respective one opposed end of the securement structure, wherein each arm is a linear element that extends along an arm longitudinal direction that is within a plane defined by the hitch longitudinal direction and the securement longitudinal direction and each arm is rotatable within the plane;
 a seat unit including a seat bottom that is foldably secured to a seat back, the bottom of the seat bottom including a seat structure for demountably and rotatably attaching the seat unit to a respective one of the pair of arms; and
 a second unit including a structure for demountably and rotatably attaching the second unit to a respective one of the pair of arms.

2. The seat assembly as claimed in claim 1 wherein the hitch structure and arrangement couples the hitch bar to the trailer hitch secured to the rear of a vehicle.

3. The seat assembly as claimed in claim 1 wherein the hitch structure and arrangement comprises apertures in the hitch bar and apertures in the trailer hitch for insertion of a pin into mating apertures in the hitch bar and apertures in the trailer hitch.

4. The seat assembly as claimed in claim 1 wherein the seat structure comprises a cylindrical connector descending along a direction perpendicular to the plane from the bottom of the seat bottom for insertion into a central aperture of a cylindrical knob at the free end of the associated one of the pair of arms, thereby to provide a demountable rotatable attachment.

5. The seat assembly as claimed in claim 1, wherein the edge of the seat bottom that is foldably secured to the seat back includes a tab that extends upwardly in the direction of the seat back bottom for holding the seat unit in its erected position when the seat unit is not folded.

6. The seat assembly as claimed in claim 1 wherein the seat assembly is formed of a synthetic plastic material.

7. The seat assembly as claimed in claim 6 wherein the synthetic plastic material is polyethylene, polypropylene, or poly vinyl chloride.

8. The seat assembly as claimed in claim 1, wherein the seat assembly is formed of a steel.

9. The seat assembly as claimed in claim 1, wherein the seat assembly is formed of rigid circular tubing, oval tubing, channel or angle shapes.

10. The seat assembly as claimed in claim 1 wherein the securement longitudinal direction is perpendicular to the hitch longitudinal direction.

11. The seat assembly as claimed in claim 1 wherein:
 each arm is demountably and rotatably attached by an arm attach structure to the respective one opposed end of the securement structure; and
 the arm attachment structure comprises a cylindrical knob at a securement end of the arm, the cylindrical knob including a central aperture, and wherein the securement structure extending across the hitch bar includes a cooperating aperture, whereby a pin may be inserted into the cooperating apertures thereby to provide a demountable and rotatable attachment.

12. The seat assembly as claimed in claim 1 wherein a frame unit is formed from the combination of the pair of arms and the hitch bar, and the frame unit can be configured with the hitch bar in parallel with and between the two arms of the pair.

13. The seat assembly as claimed in claim 1 wherein the second unit is a seat unit including a seat bottom that is foldably secured to a seat back, the bottom of the seat bottom including the structure for demountably and rotatably attaching the seat unit to the respective one of the pair of arms.

14. The seat assembly as claimed in claim 1 wherein a frame unit is formed from the combination of the pair of arms and the hitch bar, and the frame unit can be configured with the hitch bar in parallel with and between the two arms of the pair.

15. The seat assembly as claimed in claim 1 wherein:
 the seat unit includes a tab that is attached to the seat unit so that the seat back is held in an erected position when the seat back is not folded.

16. The seat assembly as claimed in claim 15 wherein the tab is positioned at the edge of the seat bottom and extends in the direction of the seat back when the seat back is not folded.

* * * * *